(No Model.) 6 Sheets—Sheet 2.
M. M. ZELLERS.
MACHINERY FOR APPLYING SHOE BUTTON FASTENERS.
No. 282,830. Patented Aug. 7, 1883.

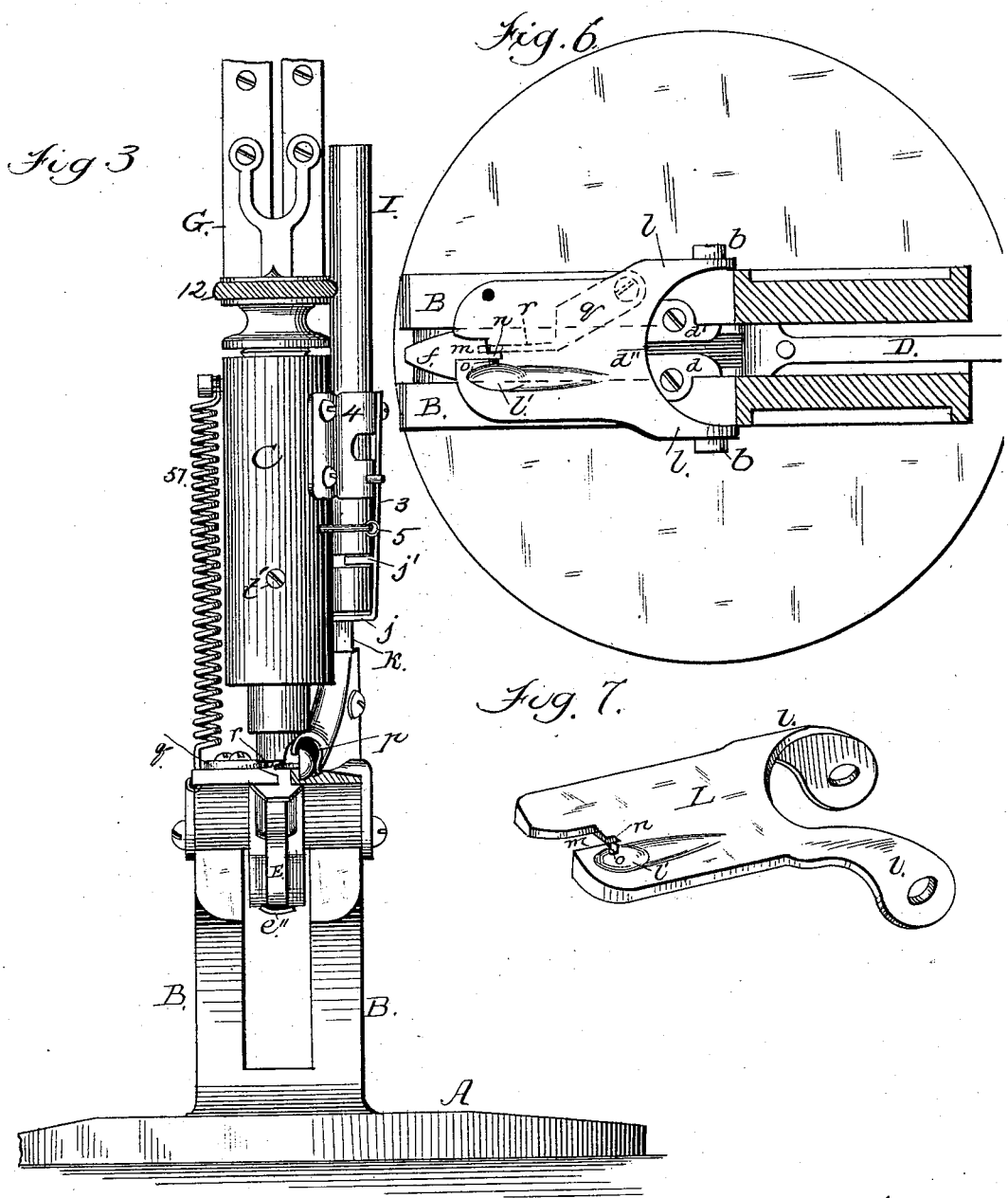

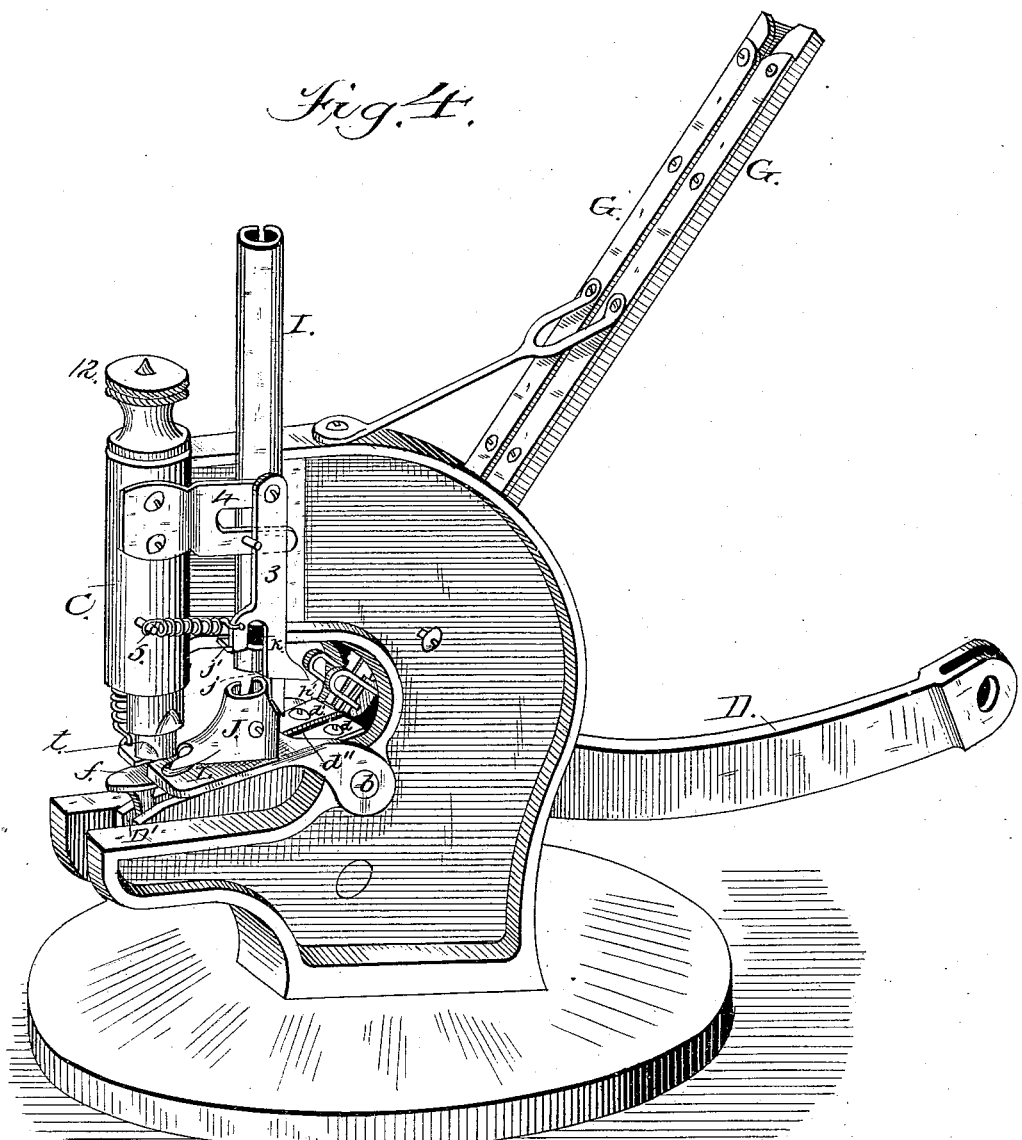

(No Model.) 6 Sheets—Sheet 5.
M. M. ZELLERS.
MACHINERY FOR APPLYING SHOE BUTTON FASTENERS.
No. 282,830. Patented Aug. 7, 1883.
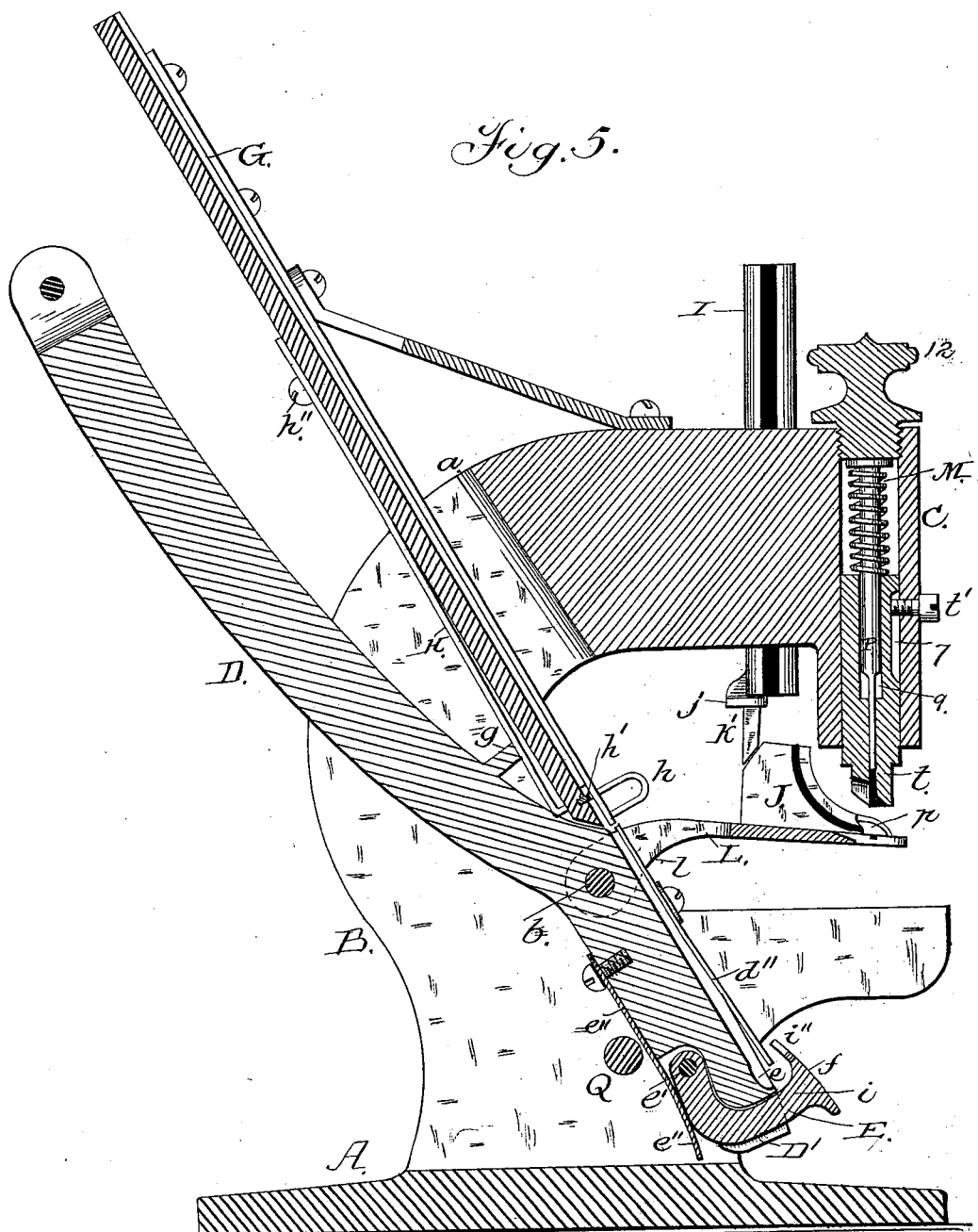

(No Model.)   6 Sheets—Sheet 6.

M. M. ZELLERS.
MACHINERY FOR APPLYING SHOE BUTTON FASTENERS.

No. 282,830. Patented Aug. 7, 1883.

Attest:
B. Walter Fowler
R. K. Evans

Inventor;
Mahlon M. Zellers
by
A. H. Evans & Co.
Attys.

UNITED STATES PATENT OFFICE.

MAHLON M. ZELLERS, OF KENT, OHIO, ASSIGNOR TO THE WILKINS SHOE BUTTON FASTENER COMPANY, OF MEADVILLE, PENNSYLVANIA.

MACHINERY FOR APPLYING SHOE-BUTTON FASTENERS.

SPECIFICATION forming part of Letters Patent No. 282,830, dated August 7, 1883.

Application filed April 17, 1883. (No model.)

*To all whom it may concern:*

Be it known that I, MAHLON M. ZELLERS, of Kent, in the county of Portage and State of Ohio, have invented certain Improvements in Machines for Applying Shoe-Button Fasteners; and I hereby declare the following to be a full, clear, and exact description thereof, reference being had to the accompanying drawings, making part of this specification, in which—

Figure 1:
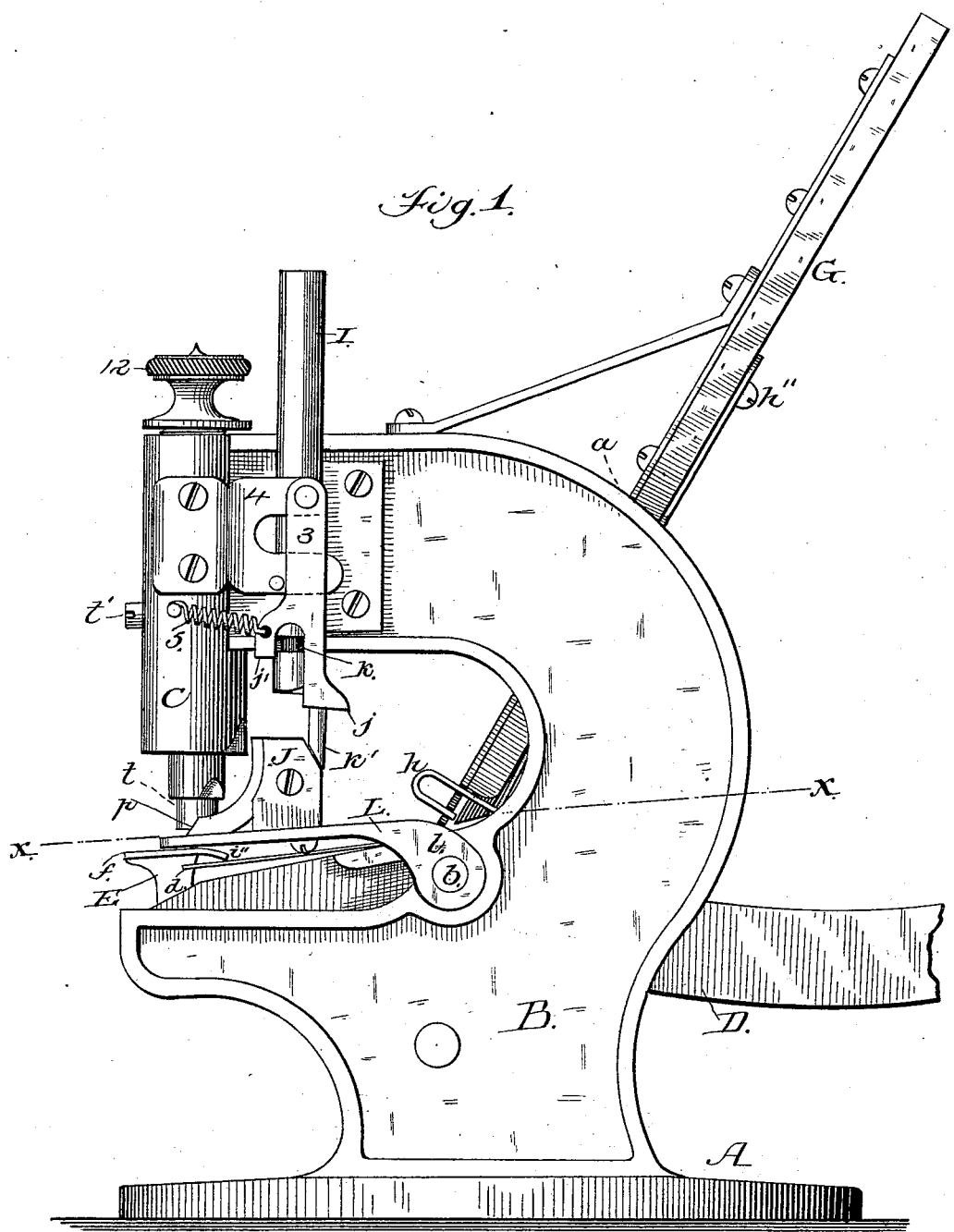
Figure 2:
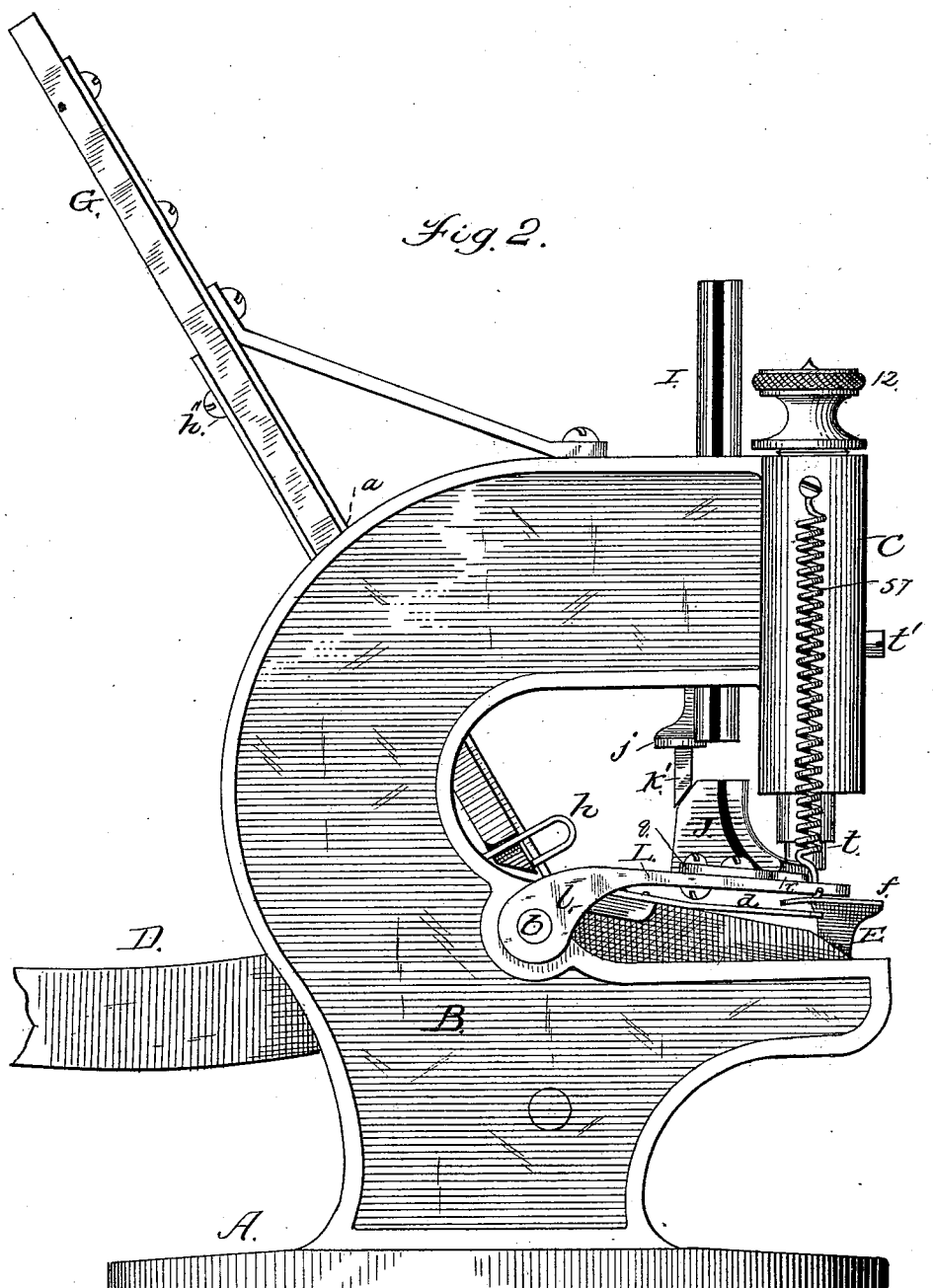
Figure 8:
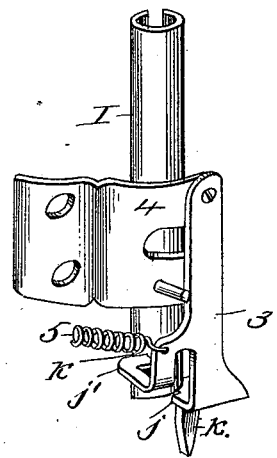
Figure 11:
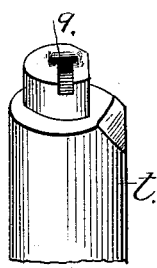
Figure 9:
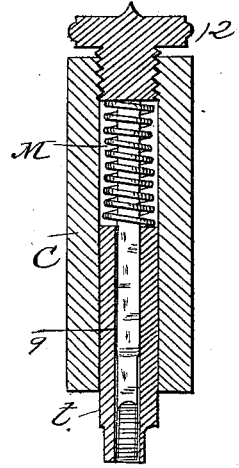
Figure 10:
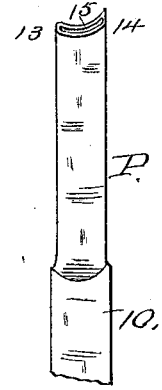

Figure 1 is a side elevation. Fig. 2 is an elevation of the side opposite the one shown in Fig. 1. Fig. 3 is a front elevation, showing the fastener through the leather and the button in place for fastening. Fig. 4 is a perspective view of the front and side on which the button-receptacle is located. Fig. 5 is a vertical sectional view with the parts of the machine as at rest, the lever being raised to receive a pin and washer from the receiver or feed-bar. Fig. 6 is a longitudinal sectional view on the line $x\,x$ of Fig. 1. Fig. 7 is a separate view of the pivoted plate which supports the button-guide and mandrel. Fig. 8 is a detail view of the button-feeding mechanism, illustrating how the cut-off feeds a single button. Fig. 9 is a transverse vertical section through the head of the machine, showing the former for the loop or coil in the pin. Fig. 10 is an enlarged view of the end of the spring-plunger, showing the receiver for the ends of the fastening-pins and the socket to receive the forming-mandrel. Fig. 11 is a view of the end of the spring-bolt, showing the slot and recess for mandrel.

The object of my invention is to provide a machine which will conveniently and expeditiously secure buttons to shoes or any other suitable fabrics by means of pin-and-washer fastenings similar to those shown in patent to A. G. Wilkins, No. 266,941, dated October 31, 1882; and it consists in certain combinations and constructions of devices, as will hereinafter be fully described, and specifically pointed out in the claims.

In order that those skilled in the art may make and use my invention, I will proceed to describe the manner in which I have carried it out.

In the said drawings, A is the bed of the machine, and B is the supporting-frame, which is divided vertically from the base upward to a point, $a$, where is formed a solid head provided with a vertical cylindrical chamber, C, for a purpose to be hereinafter fully set forth. A stout pivot, $b$, at the point shown, passes through the sides of the frame and slightly beyond, and sustains a lever, D, which is the power device that operates the machine. The rear end of the lever is bifurcated to receive the pitman of a treadle or other means of applying power. The portion of lever D forward of the pivot has its upper face channeled, and is provided with two flexible spring-guides, $d\,d'$, the opening between which form a slot, $d''$. The end of the channel in the face of the lever terminates in an anvil or depression, $e$, in which rests the washer and pin-head to hold and steady them while the fastening operation is being performed. The rear end of lever D is bifurcated, as seen at D′, and in it reciprocates a curved pin-steadying dog, E, which is pivoted to the lower face of lever D at $e'$, and has constantly pressing it upward the free end of a flat spring, $e''$, which has one end riveted to the lower face of lever D.

The head $i$ of the pin-steadying dog is constructed as follows: It has a broad flat plate, $f$, whose upper face is so curved that when the lever end D′ rises and it strikes against the leather or other material resting beneath a pivoted resisting-plate, L, the lower face of which is somewhat beveled, it recedes, turning the entire pin-steadying dog on pivot $e'$ until plate $f$ rests upon the extreme end of lever D, where the face is cut away to receive it. In the rear of the pivot $b$, set into lever D, is an upwardly-projecting stud, $g$, for the purpose of tripping the detent device, which will only allow the passage of a single fastening device, as will hereinafter appear.

Projecting upwardly and rearwardly from between the sides of the frame is a slotted guide or run, G, through which the fasteners are fed to the machine. At the lower end of the run G it is contracted, as shown, so that two curved spring-retaining fingers $h\,h$ will project slightly into the path of the travel of the fasteners, and their ends arrest the downward movement of the lowermost fastener until said ends are removed. At a point above the tips of the spring-fingers $h\,h$ equal to the distance across one of the washers of the fasteners are two small lugs, $h'\ h'$, attached to the same spring and moving upward in front of the second fastener at the instant the spring-fingers $h\ h$ are retracted to allow the lowest fastener to escape, in order that it may be conducted to the fastening-point. Both the fingers $h\ h$ and lugs $h'\ h'$ form part of and are supported by the free end of a flat spring, H, which has one end riveted at $h''$ to the guide or run G, and as the rear end of lever D is raised (see Fig. 5) the stud $g$ strikes beneath spring H and raises fingers $h\ h$, so that a fastener escapes from the run G. At this instant the slot in run G registers with the slot $d''$ in the forward end of lever D, and the escaping fastener passes down slot $d''$ until it brings up against and within the forked end $i''$ of plate $f$ on the steadying-dog E, when it is ready to be forced through the goods or leather, through the button-eye, and into the upsetting devices by depressing the rear end of lever D. As soon as the rear of lever D is depressed the spring H withdraws lugs $h'\ h'$, and another fastener passes to a point low enough to come in contact with the ends of spring-fingers $h\ h$ and be ready for the next feed. As the rear end of the lever is depressed the point of the fastener reaches the shoe, and is steadied by head or plate $f$ until it commences to pass through toward the eye of the button, which has been fed to its proper position by a mechanism hereinafter set out and claimed. After the point of the fastening-pin passes through the leather, the pressure on plate $f$ causes it to recede from its position or move forward from beneath the upsetting devices, as hereinbefore described.

The buttons are fed to the machine through a vertical slotted tube, I, the eyes of the buttons resting vertically in the slot to guide them to a proper position at the fastening-point. Partially or wholly covering the lower end of tube I is a stop, $j$, which is attached to a plate, 3, pivoted to a bracket, 4, secured to the head of the machine in any desirable manner. In the side of the tube I, opposite to the one which stop $j$ approaches, and above the end the length of the diameter of one button, is cut a slot, $k$, and through the slot enters another stop, $j'$, attached to plate 3. A spring, 5, keeps the plate in such a position that normally the stop $j$ projects over the lower end of tube I; but when that spring is distended by means of a bevel-faced pin $k'$ being struck by a beveled surface on a curved slotted button-guide, J, the stop $j$ is withdrawn, and a button passes into the button-guide J, and at the same time stop $j'$ projects through slot $k$ behind the falling button and prevents any other one passing downward.

Overlying the feeding end of lever D is a swinging plate, L, provided with two backwardly-projecting ears, $l$, each of which is pivoted outside the frame on an end of pivot $b$. The center of the front end of plate L is recessed, as shown at $m$, the sides of recess being flaring, and the square back of the recess is provided at one side with a small jog, $n$, in which the shank of the fastening-pin rests while undergoing the upsetting operating. On one side of recess $m$, next to or beneath the button-feeding device, the upper surface of the plate L is cut out to make a socket, $l'$, to receive and hold the body of the button while being attached. The edge of the socket $l'$ is cut away at $o$ to form a recess, in which will rest the shank of the button-eye, so that it shall maintain a horizontal position. The recess $m$ grows gradually shallower toward the rear of the machine until its curvature merges into the curve of the bottom of a slotted button-guide, J, which is fixed to and moves with plate L, and is so fixed with reference to the oscillation of the plate L that when said plate is at its highest point the top of the guide will register with the bottom of the button-feeding tube I and the slot in guide J registers with the slot in tube I, so that the buttons have a continuous passage to the fastening-point, and the slots so guide the eyes that they lie horizontally over the point of the fastener when the button rests in the recess $m$. The inner side of the lower end of the guide J is cut away at $p$, to admit of the easy withdrawal of the button after it is attached.

Secured to the top of plate L, on the side opposite the button-guide, is a plate, $q$, which is provided at its end with a finger or mandrel, $r$, which projects centrally over recess $m$ for a short distance, and around this mandrel the fastening-pin is bent by devices hereinafter described, the mandrel insuring a uniformity of bend in the pin.

Within the cylindrical chamber C in the head of the machine is a bolt, $t$, which is centrally bored a part of its length and slotted the remainder of its length. The bolt $t$ is allowed a vertical movement limited by a slot, 7, into which projects a set-screw, $t'$, and a coiled spring, M, confined within the cylindrical chamber, keeps the bolt $t$ normally depressed with a force sufficient to resist an upward movement of the bolt before the pin has been entirely thrust through the material, and the washer and head brought snugly up against the under side of the shoe-upper, during which the head of the pin-steadying dog recedes, so that the anvil $e$ comes close up beneath the shoe material and presses the washer and head of the fastener against it. The upward passage of the forward end of the lever carries the fastening-pin up into and through the jog $n$ and into and against one side of the slot 9 in the lower end of bolt $t$. This slot 9 serves to confine the pin of the fastening device while it is being coiled in the eye of the button. The coiling or upsetting is done by means of an upsetting-tool, P, which is provided with a head, 10, and a partially-cylindrical and partially-flat body to fit within the bolt $t$. The spring M lies between the head 10 and the top of the bolt $t$, and a screw with a milled head, 12, turned into the top of the cylindrical chamber C rests upon and forms a bearing for the head 10, whereby an adjustment of its height is easily attained. The lower end of slot 9 on the side where the pin rests is somewhat rounded to form a good bearing for the pin. In the lower face of the bolt $t$ a recess is cut from the rear to the slot 9 and at right angles to said slot, and so tapered that the finger or mandrel $r$ fits snugly into it and abuts its end against the opposite side of the slot 9. In passing into slot 9 the pin passes between the mandrel and the rounded edge of the slot. The end of the upsetting-tool has one edge, 13, rounded to closely fit slot 9, and the lower face is cut on a curve with the edge 14, or the square edge slightly lower than the other edge, so that the effect of this edge 14 may continue as long as possible on the bent pin. The face of the upsetting end is provided with a groove, 15, which vanishes toward the edges of the tool, being deepest in the center, as shown. A spring, 57, coiled or otherwise, having one end fastened to the head of the machine and the other end to the plate L, serves to support the plate in a horizontal position when the forward end of the lever is thrown down. This of course is overcome by the distention of spring M to the extent allowed by the slot in the bolt $t$ and the set-screw. A stop, Q, between the sides of frame limits the downward throw of the forward end of the lever.

The operation is as follows: The button-tube and fastener-guide or run being properly filled and the rear end of the lever fixed to admit a fastener, as seen in Fig. 5, the stop $j$ is moved back by hand to allow one button to fall to the fastening-point and rest in recess $m$. The fastener at the same time rests in the forked end $i''$ of the steadying-dog E. The rear of the lever is forced sharply down, and the shoe-upper being in place beneath plate L, and held by the hands of the operator, the pin is passed through it, up through the jog $n$, and into the slot in bolt $t$, between the mandrel and the rounded edge of the slot. When the pressure is such that the steadying-dog recedes and the plate L comes in contact with the lower end of the bolt $t$, said bolt is forced upward by compressing-spring M, and the point of the pin progresses until it comes in contact with the higher side of the curved grooved face of the upsetting-tool P, when it is deflected over the mandrel, and, the pressure being continued, the pin is curled downward until a perfect loop is formed, engaging the eye of the button, yet leaving a straight shank to the fastening device. As the last portion of the work of the lever is performed the differential movement of the plate L on its pivot withdraws the mandrel from the loop and allows the end of the tool P to pass it and force out the fastening-pin. When the loop is completely turned, the rear of the lever is raised to the position at starting, and the plate L has been thrown to its normal position by the distention of spring M, the finger is placed upon its edge, the plate further depressed, and the fastened button withdrawn.

It will be observed that the leather of the shoe or other material to which the buttons are being fastened is removed from any possible contact with a fastening-pin other than the one to be used at the moment.

I am aware that heretofore a mandrel has been used in a machine for making staple seams in leather, and that the wire has been bent, before passing into the leather, over said mandrel to form a fastening device, and I am also aware that in such machines the mandrel advances and recedes, hence I do not broadly claim a mandrel applied to a fastening-machine, nor broadly a mandrel that advances and recedes, but confine my invention in this respect to a machine for fastening on buttons, and to the mandrel acting on the fastener already made as a complete article, and after it has been passed through the leather, and said mandrel moving forward to bear against the fastening after it has passed through the leather to produce an effect on the fastener, and receding as that effect is finished.

Having thus described my invention, what I claim as new, and desire to secure by Letters Patent, is—

1. In a button-fastening machine, the lever provided with means, substantially as described, for carrying the fastener, in combination with the spring-loop-forming bolt and an intermediate pivoted plate provided with a mandrel around which the fastening devices or pins are bent.

2. In a button-fastening machine, the combination of a lever provided with means, substantially as described, for receiving and carrying the fastener, with a spring-bolt having a forming-slot in its lower end and a centrally-arranged interior upsetting-tool, substantially as and for the purpose set forth.

3. A lever adapted to carry the fastening device and a spring-bolt provided with an interior upsetting-tool, in combination with the intermediate movable button-support, substantially as and for the purpose described.

4. In a button-fastening machine, a loop-former for the fastening-pin, in combination with a mandrel around which the pin is bent after passing through the leather, substantially as set forth.

5. In a button-fastening machine, a loop-former for the fastening-pin, in combination with a reciprocating mandrel which advances across the loop-former after the fastener has been entirely passed through the material and recedes after the loop is formed, substantially as and for the purpose described.

6. In a button-fastening machine, a button-guide arranged on movable bearings, substantially as described, to advance to and to recede from the button-feeding device and receive a single button and conduct it to the fastening-point, substantially as specified.

7. The channeled lever D, in combination with the pivoted steadying-dog E, provided with a forked end and spring, substantially as set forth.

8. The channeled lever provided with an anvil, e, at the end of the conducting-channel and conforming to the shape of the head of the fastening device, as set forth.

9. The run or guide for the fasteners, operated by the lever D, in combination with the spring H, provided with the curved detent-fingers and lugs h' h', whereby only one fastener can escape at a time, substantially as set forth.

10. The run or guide G, provided with the flat spring, H, carrying spring detent-fingers h and lugs h', in combination with lever provided with the stud g to operate said spring, as set forth.

11. In a button-fastening machine, the intermediate pivoted plate, L, for sustaining and steadying the shoe-upper while being operated upon, substantially as set forth.

12. The pivoted plate L, provided with a supporting device, 57, and adapted to steady and support the upper, in combination with a yielding spring resisting device to insure the washer being close against the surface of the goods before the pin is in any degree upset.

13. The button-feeding tube I, in combination with the spring-plate 3, provided with the alternately-acting stops j j' and the beveled pin, and the button-guide provided with a beveled face, substantially as and for the purpose described.

MAHLON M. ZELLERS.

Witnesses:
ALEXANDER G. WILKINS,
SAMUEL S. PORTER.